United States Patent [19]

Gervase et al.

[11] Patent Number: 5,367,010
[45] Date of Patent: Nov. 22, 1994

[54] ADHESIVE COMPOSITIONS BASED ON CHLORINATED ETHYLENE/VINYL ACETATE COPOLYMERS

[75] Inventors: Nicholas J. Gervase; Louie G. Manino, both of Erie, Pa.

[73] Assignee: Lord Corporation, Erie, Pa.

[21] Appl. No.: 34,067

[22] Filed: Mar. 22, 1993

[51] Int. Cl.$^5$ ............................................. C08K 5/32
[52] U.S. Cl. ................................... 524/260; 524/259; 524/394; 524/396; 524/397; 524/398; 524/399; 524/413; 524/414; 524/424; 524/430; 524/432; 524/433; 524/434; 524/509; 524/510; 525/109; 525/110; 525/119; 525/133; 525/139; 525/140; 525/143

[58] Field of Search ............... 524/259, 260, 509, 510, 524/394, 396, 397, 398, 399, 413, 414, 424, 430, 432, 433, 434; 525/109, 110, 119, 133, 139, 140, 143

[56] References Cited

U.S. PATENT DOCUMENTS

| | | | |
|---|---|---|---|
| 3,258,388 | 6/1966 | Coleman et al. | 161/218 |
| 3,258,389 | 6/1966 | Coleman et al. | 161/218 |
| 3,438,931 | 4/1969 | Mitchell et al. | 524/509 |
| 3,502,603 | 3/1970 | Gallagher et al. | 524/509 |
| 3,600,353 | 8/1971 | Baker | 524/509 |
| 3,620,860 | 11/1971 | Eckardt et al. | 156/247 |
| 3,650,984 | 3/1972 | Jones | 524/260 X |
| 3,880,808 | 4/1975 | Hausch et al. | 524/260 X |
| 4,043,962 | 8/1977 | Adler et al. | 525/143 X |
| 4,108,924 | 8/1978 | Akagane et al. | 525/143 X |
| 4,119,587 | 10/1978 | Jazenski et al. | 524/259 X |
| 4,316,968 | 2/1982 | Girgis | 524/509 X |
| 4,460,717 | 7/1984 | Saeki et al. | 524/259 X |
| 4,769,413 | 9/1988 | Fleming et al. | 524/509 X |
| 5,028,654 | 7/1991 | Wuest et al. | 524/259 X |
| 5,084,503 | 1/1992 | Iacoviello | 524/459 |
| 5,117,045 | 5/1992 | Nishijima et al. | 560/219 |
| 5,182,322 | 1/1993 | Dawes | 524/308 |

FOREIGN PATENT DOCUMENTS

| | | | |
|---|---|---|---|
| 7306761 | 12/1973 | Netherlands | 524/259 |
| 2078770 | 1/1982 | United Kingdom | 524/260 |

*Primary Examiner*—Judy M. Reddick
*Attorney, Agent, or Firm*—W. Graham Buie

[57] ABSTRACT

An adhesive composition containing a chlorinated ethylene/vinyl acetate copolymer and at least one of a phenolic resin and an aromatic nitroso compound as an adhesion-promoting additive. The chlorinated ethylene/vinyl acetate copolymer can be prepared without the utilization of environmentally hazardous chlorinated solvents and provides for adhesive compositions which exhibit excellent adhesion and resistance to adverse environmental conditions.

22 Claims, No Drawings

5,367,010

ADHESIVE COMPOSITIONS BASED ON CHLORINATED ETHYLENE/VINYL ACETATE COPOLYMERS

FIELD OF THE INVENTION

The present invention relates to adhesive compositions useful for bonding various materials such as elastomeric substrates and metal surfaces. More specifically, the present invention relates to adhesive compositions based on chlorinated ethylene/vinyl acetate copolymers and one or more adhesion-promoting additives.

BACKGROUND OF THE INVENTION

There is a wide variety of adhesive compositions currently available for bonding elastomeric materials to metal surfaces. Many of these adhesive compositions utilize various halogenated polymers to provide the adhesive compositions with film-forming capability, enhanced adhesion, and resistance to adverse environmental conditions. One of the most common and most effective halogenated polymeric materials is chlorinated natural rubber or chlorinated synthetic rubber such as chlorinated polyisoprene. The chlorinated natural and synthetic rubbers have been found to provide excellent film-forming properties, adhesion enhancement, and environmental resistance when utilized in adhesive compositions for bonding elastomeric materials to metal surfaces.

The process for preparing the chlorinated rubber materials traditionally employed in adhesive compositions typically involves the utilization of highly chlorinated solvents such as carbon tetrachloride. The increasing number of environmental regulations relating to chlorinated solvents has limited the availability and usability of many of these chlorinated solvents. In fact, the utilization of chlorinated solvents in industry may become totally prohibited in the very near future.

Processes for preparing chlorinated rubber materials which do not utilize chlorinated solvents are therefore currently being explored. However, a process has yet to be developed which produces chlorinated rubber materials equivalent to the materials produced by a process based on chlorinated solvents such as carbon tetrachloride. Therefore, the adhesive industry is beginning to consider alternative materials which can be prepared without the utilization of chlorinated solvents and which can act as an effective substitute for the traditional chlorinated rubber materials.

Chlorinated polyolefins, such as chlorinated polyethylene, can be prepared without the utilization of chlorinated solvents and have previously been utilized in adhesive compositions as alternatives to chlorinated rubber materials. Chlorinated polyolefins, however, have traditionally not provided adequate film-forming capability, adhesion enhancement, or environmental resistance, so as to be effective for use in adhesive compositions.

A need therefore exists for a chlorinated polymeric material which can be prepared without the utilization of chlorinated solvents and which can be utilized as an effective substitute for the traditional chlorinated rubber materials.

SUMMARY OF THE INVENTION

The present invention relates to chlorinated ethylene/vinyl acetate copolymers which can be prepared without the utilization of chlorinated solvents and which can be utilized in adhesive compositions so as to provide effective film-forming capability, adhesion enhancement, and resistance to adverse environmental conditions. It has presently been discovered that chlorinated ethylene/vinyl acetate copolymers can be utilized in adhesive compositions so as to provide performance equivalent to or greater than the performance provided by the traditional chlorinated rubber materials utilized in adhesive compositions. More specifically, the present invention relates to an adhesive composition comprising a chlorinated ethylene/vinyl acetate copolymer and at least one adhesion-promoting additive selected from the group consisting of a phenolic resin and an aromatic nitroso compound.

DETAILED DESCRIPTION OF THE INVENTION

The ethylene/vinyl acetate copolymers to be chlorinated in accordance with the present invention can be prepared by the reaction of ethylene and vinyl acetate monomers in the presence of a free radical initiator by methods well known to those skilled in the art. Suitable free radical initiators or catalysts include organic oxides, peroxides, hydroperoxides, azo compounds, etc., such as hydrogen peroxide, benzoyl peroxide, cumene hydroperoxide, di-tert-butyl peroxide, ascaridole, acetyl peroxide, tert-butyl hydroperoxide, trimethylamine oxide, dimethylaniline oxide, isopropylperoxydicarbonate, diisobutylene ozonide, peracetic acid, nitrates, chlorates, perchlorates, azobisisobutyronitrile, etc. Suitable concentrations of the catalysts are between about 0.0001 and 5 percent and preferably between about 0.001 and 1 percent by weight of the total reaction mixture.

One of the methods which may be used for polymerizing the monomers to form an ethylene/vinyl acetate copolymer is emulsion polymerization. By this method, polymerization takes place in an aqueous medium with the aid of emulsifying agents. The monomeric reactants are present almost entirely as emulsion or suspension droplets dispersed in the continuous phase. The emulsifying agent used is not critical and may be anionic, cationic or non-ionic. However, since the aqueous phase is present usually in greater quantity than the organic phase, the use of anionic agents resulting in an oil-in-water type emulsion may be preferred. Suitable emulsifying agents which may be used include such materials as the fatty acids and their soaps including substituted derivatives of the fatty acids and their soaps including substituted derivatives of the fatty acids and rosin acids, sulfuric esters including salts of sulfated fatty oils and alcohols, alkane sulfonates, alkarylsulfonates, mahogany and petroleum sulfonates, as well as phosphorus-containing emulsifying agents. Some specific examples of emulsifying agents include the alkali metal salts of $C_{12}$ to $C_{18}$ straight-chain carboxylic acids, i.e., sodium stearate, sodium oleate, and mixtures thereof; acids obtained from tallow, coconut oil, palm oil, etc.; tall oil acid soaps; sodium lauryl sulfate; sodium dodecyl benzene sulfonate; sodium di(2-ethylhexyl)ortho-phosphate and the like. Any amount of emulsifying or suspending agent may be used which will provide at least a relatively stable emulsion or suspension of the polymerization ingredients. Generally, from about 0.5 to 10 percent by weight of emulsifying agent is sufficient.

The copolymers may also be prepared by polymerizing the monomers in bulk without the addition of other diluents. Alternatively, solution polymerization in the presence of inert hydrocarbon diluents such as butane, pentane, hexane, cyclohexane, offers the advantage of removing heat of polymerization as well as maintaining the solid polymer in a fluid slurry. Other suitable polymerization techniques may also be used.

The ethylene/vinyl acetate copolymers typically contain from about 1 to 99, preferably from about 1 to 40, most preferably from about 2 to 15, percent by weight vinyl acetate monomer (VA).

The ethylene/vinyl acetate copolymers may be chlorinated by various techniques known in the art for chlorinating polyolefinic materials such as dissolving the ethylene/vinyl acetate copolymers in a solvent and subjecting the resulting solution to chlorine gas.

The chlorination may also be carried out by the formation of a suspension or dispersion of a high surface area powder of ethylene/vinyl acetate copolymer in water by the use of a surfactant. Such an aqueous suspension or dispersion may then be subjected to chlorine gas in the presence of free-radical initiators or ultraviolet irradiation. An example of a chlorination process utilizing an aqueous suspension of ethylene/vinyl acetate powder having a specific surface area of not less than 300 cm$^2$/g is disclosed in U.S. Pat. No. 5,117,045.

The chlorination is typically carried out until the ethylene/vinyl acetate copolymer contains from about 40 to 70, preferably from about 50 to 65 percent by weight chlorine. The chlorinated ethylene/vinyl acetate copolymer typically has a molecular weight ranging from about 10 to 150,000, preferably from about 20,000 to 100,000.

Chlorinated ethylene/vinyl acetate copolymers are also commercially available from E. I. Du Pont de Nemours & Co. under the tradename HYPALON, in particular the HYPALON CP 100 Series.

The chlorinated ethylene/vinyl acetate copolymers are typically utilized in an amount ranging from about 1 to 99, preferably from about 40 to 60, percent by weight of the essential ingredients of the present invention. Essential ingredients of the present invention herein refers to the chlorinated ethylene/vinyl acetate copolymer and the one or more adhesionpromoting additives.

The phenolic resins useful as an adhesion-promoting additive in the adhesive compositions of the present invention can be any of the well known phenolic resins prepared, for example, by reacting a phenolic compound with an aldehyde con, pound under acidic, neutral or basic conditions with an appropriate catalyst. Phenolic resins useful in the invention include unmodified phenolic resins, cashew-modified phenolic resins, epoxy-modified phenolic resins, and elastomer-modified phenolic resins.

The phenolic compound useful for preparing the present phenolic resins can be a monohydroxy aromatic compound, a multihydroxy aromatic compound or a combination thereof. The phenolic compound may be substituted with groups such as alkyl, alkoxy, amino, halogen and the like. Examples of phenolic compounds useful in the invention include phenol, p-t-butylphenol, p-phenylphenol, o-ethylphenol, p-chlorophenol, palkoxyphenol, o-cresol, m-cresol, p-cresol, o-chlorophenol, m-bromophenol, 2-ethylphenol, amylphenol, nonylphenol, cashew nutshell liquid, resorcinol, orcinol, phloroglucinol, pyrocatechol, pyrogallol, naphthol, xylenol, carvacrol, salicylic acid, bisphenol A, hisphenol S, combinations thereof, and the like, with phenol being presently preferred.

The aldehyde compound useful for preparing the phenolic resins of the present invention can be any aldehyde compound previously known for this purpose. Examples of aldehyde compounds useful in the invention include formaldehyde, acetaldehyde, propionaldehyde, isobutyraldehyde, 2-ethylbutrylaldehyde, 2-methylpentaldehyde, and 2-ethylhexaldehyde. The aidehyde compound of the invention may also be any of the other various forms of formaldehyde, including compounds which decompose to formaldehyde such as paraformaldehyde, trioxane, furfural, hexmethylene-tetramine, benzaldehyde, and the like. The aldehyde compound can also be any of the acetals which liberate formaldehyde upon heating. Formaldehyde is the presently preferred aldehyde compound.

The phenolic resin is preferably formed in a conventional manner from the condensation of from about 0.8 to 5 moles of aidehyde compound per mole of phenolic compound to afford an organic solvent-soluble resin having a molecular weight in the range of from about 200 to 2,000, preferably from about 300 to 1,200. A particularly preferred phenolic resin is a mixture of a phenol-formaldehyde resin and a phenol-formaldehyde resin modified with cresol. Another preferred phenolic resin is derived from an approximate 1:1 ratio of phenol and m-cresol and has a molecular weight between about 200 and 1000, preferably between about 400 and 600. Mixtures of phenolic resins may also be utilized. The phenolic resin is typically utilized in an amount ranging from about 1 to 99, preferably from about 40 to 60, percent by weight of the essential ingredients of the present invention.

The nitroso con, pound useful as an adhesion-promoting additive of the present invention can be any aromatic hydrocarbon, such as benzenes, naphthalenes, anthracenes, biphenyls, and the like, containing at least two nitroso groups attached directly to non-adjacent ring carbon atoms. More particularly, such nitroso compounds are described as aromatic compounds having from I to 3 aromatic nuclei, including fused aromatic nuclei, having from 2 to 6 nitroso groups attached directly to non-adjacent nuclear carbon atoms. The present preferred nitroso compounds are the dinitroso aromatic compounds, especially the dinitrosobenzenes and dinitrosonaphthalenes, such as the meta- or para-dinitrosobenzenes and the meta- or para-dinitrosonaphthalenes. The nuclear hydrogen atoms of the aromatic nucleus can be replaced by alkyl, alkoxy, cycloalkyl, aryl, aralkyl, alkaryl, arylamine, arylnitroso, amino, halogen, and like groups. The presence of such substituents on the aromatic nuclei has little effect on the activity of the nitroso compounds in the present invention. As far as is presently known, there is no limitation as to the character of the substituent, and such substituents can be organic or inorganic in nature. Thus, where reference is made herein to nitroso compound, it will be understood to include both substituted and unsubstituted nitroso compounds, unless otherwise specified.

Particularly preferred nitroso compounds are characterized by the formula:

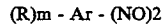

$$(R)_m - Ar - (NO)_2$$

wherein Ar is selected from the group consisting of phenylene and naphthalene; R is a monovalent organic radical selected from the group consisting of alkyl, cycloalkyl, aryl, aralkyl, alkaryl, arylamine, and alkoxy radicals having from 1 to 20 carbon atoms, amino, or halogen, and is preferably an alkyl group having from 1 to 8 carbon atoms; and m is zero, 1, 2, 3, or 4, and preferably is zero.

A partial non-limiting listing of nitroso compounds which are suitable for use in the practice of the invention include m-dinitrosobenzene, p-dinitrosobenzene, m-dinitrosonaphthalene, p-dinitrosonaphthalene, 2,5-dinitroso-p-cymeme, 2-methyl-1,4-dinitrosobenzene, 2-methyl-5-chloro-1,4dinitrosobenzene, 2-fluoro- 1,4-dinitrosobenzene, 2-methoxy- 1-3-dinitrosobenzene, 5-chloro-1,3-dinitrosobenzene, 2-benzyl-1,4-dinitrosobenzene, 2-cyclohexyl-1,4-dinitrosobenzene and combinations thereof. Particularly preferred nitroso compounds include p-dinitrosobenzene and m-dinitrosobenzene. While the nitroso compound may be utilized in the same amounts as the phenolic resin described above (i.e., I to 99, or 40 to 60 percent by weight), the nitroso compound is typically utilized in an amount ranging from about 1 to 60, preferably from about 3 to 10, percent by weight of the essential ingredients of the present invention.

In addition to the chlorinated ethylene/vinyl acetate copolymers, the adhesive compositions of the present invention may contain an additional halogenated polymeric material which can function as a supplemental film-forming component. The additional halogenated polymeric material may be essentially any halogenated polymer other than the chlorinated ethylene/vinyl acetate copolymers, and representative examples include chlorinated natural rubber, chlorine- and bromine-containing synthetic rubbers including polychloroprene, chlorinated polychloroprene, chlorinated polyisoprene, chlorinated polybutadiene, hexachloropentadiene, butadiene/halogenated cyclic conjugated diene adducts, chlorinated butadiene styrene copolymers, chlorosulfonated polyethylene, brominated poly(2,3-dichloro-1,3-butadiene), copolymers of α-haloacrylonitriles and 2,3-dichloro-1,3-butadiene, chlorinated poly(-vinyl chloride), chlorinated polyethylene, chlorinated ethylene/propylene copolymers, chlorinated ethylene/propylene/non-conjugated diene terpolymers and the like, including mixtures of such halogen-containing elastomers. Thus substantially any of the known halogen-containing derivatives of natural and synthetic elastomers can be employed as additional halogenated polymeric materials in the practice of this invention, including mixtures of such elastomers.

If utilized, the additional halogenated polymeric material is typically utilized in an amount ranging from about 1 to 99, preferably from about 40 to 60, percent by weight of the total ingredients (excluding water and solvent) of the adhesive composition.

The adhesive compositions of the present invention may optionally contain a metal oxide for purposes of consuming any acid compound byproducts produced during the bonding process. The metal oxide of the present invention can be any known metal oxide such as the oxides of zinc, cadmium, magnesium, lead, and zirconium; litharge; red lead; zirconium salts; and combinations thereof. Various lead-containing compounds may also be utilized in lieu of or in addition to, the metal oxide. Examples of such lead-containing compounds include lead salts such as polybasic lead salts of phosphorous acid and saturated and unsaturated organic dicarboxylic acids and acid anhydrides. Specific examples of lead salts include dibasic lead phthalate, monohydrous tribasic lead maleate, tetrabasic lead fumarate, dibasic lead phosphite, and mixtures thereof. Other examples of lead-containing compounds include basic lead carbonate, lead oxide and lead dioxide.

The adhesive compositions of the present invention can optionally contain contain other well-known additives including plasticizers, fillers, pigments, surfactants, dispersing agents, wetting agents, reinforcing agents and the like, in amounts employed by those skilled in the adhesive arts to obtain a desired color and consistency. Examples of optional ingredients include carbon black, silica such as fumed silica, sodium aluminosilicate, and titanium dioxide.

The adhesive compositions of the present invention may be prepared as solvent-based or water-based formulations. In the case of a solvent-based formulation, the ingredients of the adhesive are combined in an appropriate solvent. The solvent may essentially be any solvent capable of adequately dissolving the ingredients for purposes of forming an adhesive composition capable of being applied as a thin film. Solvents useful for preparing formulations according to the present invention include aliphatic ketones, such as methylethyl ketone, methylisobutyl ketone, aliphatic esters such as ethylacetate and butyl acetate, and aromatic hydrocarbons such as toluene and xylene. The solvent is typically utilized in an amount sufficient to obtain a total solids content ranging from about 60 to 90, preferably from about 70 to 80, percent.

In the case of water-based formulations, the chlorinated ethylene/vinyl acetate copolymer is utilized in the form of a latex. The latex of the chlorinated ethylene/vinyl acetate copolymer may be prepared according to methods known in the art such as by dissolving the chlorinated ethylene/vinyl acetate copolymer in a solvent and adding a surfactant to the resulting solution. Water can then be added to the solution under high shear to emulsify the polymer. The solvent is then stripped to obtain a latex which can be suitably utilized in a water-based formulation.

Another method of preparing a latex of a chlorinated ethylene/vinyl acetate copolymer is disclosed in U.S. Pat. No. 5,182,322.

The latex of the chlorinated ethylene/vinyl acetate copolymer is combined with the other ingredients and a sufficient amount of water, preferably deionized water, so as to prepare an adhesive composition having a typical total solids content of between about 10 and 70 percent, preferably between about 30 and 50 percent.

The adhesive con, positions may be applied to a surface to be bonded by spraying, dipping, brushing, wiping, roll-coating or the like, after which the adhesive composition is permitted to dry. The adhesive composition is typically applied in an amount sufficient to form a dry film thickness ranging from about 0.1 to 1.0 mils, preferably from about 0.2 to 0.8 mils. In the case of a two-coat adhesive con, position as described more fully hereinafter, the overcoat is applied in a similar manner over the prime coat which has been permitted to completely dry.

The adhesive compositions of the present invention are capable of bonding any substrate or surface capable of receiving the adhesive composition. The material, which may be bonded to a surface such as a metal surface in accordance with the present invention, is preferably a polymeric material, including any elastomeric material selected from any of the natural rubbers and olefinic synthetic rubbers including polychloroprene, polybutadiene, neoprene, Buna-S, Buna-N, butyl rubber, brominated butyl rubber, nitrile rubber, and the like. The surface to which the material is bonded can be any surface capable of receiving the adhesive such as a glass, plastic, or fabric surface, and is preferably a metal surface selected from any of the common structural metals such as iron, steel (including stainless steel), lead, aluminum, copper, brass, bronze, Monel metal, nickel, zinc, and the like. Prior to bonding, a metal surface is typically cleaned according to one or more methods known in the art such as degreasing, grit-blasting and zinc-phosphatizing.

The present adhesive compositions are preferably utilized to bond an elastomeric material to a metal surface. The adhesive composition is typically applied to the metal surface and the coated metal surface and elastomeric substrate are then brought together under heat and pressure to complete the bonding procedure. The surface of the metal and the elastomeric substrate are typically brought together under a pressure of from about 20.7 to 172.4 Mega Pascals (MPa), preferably from about 20 MPa to 50 MPa. The resulting rubber-metal assembly is simultaneously heated to a temperature of from about 140° C. to about 200° C., preferably from about 150° C. to 170° C. The assembly should remain under the applied pressure and temperature for a period of from about 3 minutes to 60 minutes, depending on the cure rate and thickness of the rubber substrate. This process may be carried out by applying the rubber substrate as a semimolten material to the metal surface as in, for example, an injectionmolding process. The process may also be carried out by utilizing compression molding, transfer molding or autoclave curing techniques. After the process is complete, the bond is fully vulcanized and ready for use in a final application.

The adhesive compositions of the invention may be utilized as onecoat adhesive systems without the assistance of other adhesive coats or layers. However, in the case of bonding elastomeric materials to metal surfaces, the utilization of a phenolic resin as the adhesion-promoting additive allows the adhesive composition to be characterized as an adhesive prime coat. As such, the adhesive prime coat may be applied to the metal surface over which a conventional overcoat may be applied. On the other hand, when the adhesion-promoting additive is an aromatic nitroso compound, the adhesive composition may be characterized as an adhesive overcoat. An adhesive overcoat is typically applied to a metal surface which has first been coated with a conventional adhesive prince coat.

The present invention therefore also relates to a two-coat adhesive composition wherein the adhesive compositions of the present invention are utilized as both the adhesive prime coat and the adhesive overcoat. Specifically, the two-coat adhesive composition comprises an adhesive prime coat and an adhesive overcoat wherein the adhesive prime coat is a chlorinated ethylene/vinyl acetate copolymer of the present invention and a phenolic resin, and wherein the adhesive overcoat is a chlorinated ethylene/vinyl acetate copolymer of the present invention and an aromatic nitroso compound.

It should also be noted that it has presently been discovered that the chlorinated ethylene/vinyl acetate copolymers of the present invention can be utilized to bond acrylonitrile-butadiene copolymer rubber to a metal surface without the need for an adhesion-promoting additive. One embodiment of the present invention therefore relates to a method of bonding acrylonitrile-butadiene copolymer rubber to a metal surface by applying a chlorinated ethylene/vinyl acetate copolymer between the acrylonitrile rubber and the metal surface to be bonded. An adhesive bond is then formed by applying heat and pressure according to the bonding procedure described above.

The acrylonitrile-butadiene copolymer rubbers to be bonded with the chlorinated ethylene/vinyl acetate copolymers can be any of the well known acrylonitrile-butadiene copolymer rubbers. The acrylonitrile-butadiene copolymer rubbers can be prepared by reacting a conjugated diene and an unsaturated nitrile in the presence of a free radical initiator by methods well known to those skilled in the art. The conjugated dienes useful for preparing the acrylonitrile-butadiene copolymers can be any of the wellknown conjugated dienes including 1,3-butadiene; 2,3-dimethylbutadiene; 1,3-pentadiene; 1,3-hexadiene; 2,4-hexadiene; 1,3-heptadiene; piperylene; and isoprene; with 1,3-butadiene presently being preferred.

The unsaturated nitriles useful for preparing the acrylonitrilebutadiene copolymers typically correspond to the following formula:

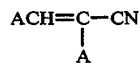

wherein each A is hydrogen or a hydrocarbyl group having from 1 to about 10 carbon atones. Examples of A groups include alkyl and cycloalkyl, such as methyl, ethyl, isopropyl, t-butyl, octyl, decyl, cyclopentyl, cyclohexyl, etc., and aryls such as phenyl, tolyl, xylyl, ethylphenyl, t-butylphenyl, etc. Acrylonitrile and methacrylonitrile are the presently preferred unsaturated nitriles.

The metal surface to be bonded to the acrylontrile-butadiene copolymer rubber in the absence of an adhesion-promoting additive can be any of the metal surfaces described above.

The following examples are provided for purposes of illustrating the invention and are not intended to limit the scope of the present invention which is defined by the claims.

EXAMPLE 1

As adhesive composition characterized as an adhesive overcoat is prepared by combining the following ingredients in xylene in an amount sufficient to create a final total solids content (based on all ingredients) of about 24 percent.

| Ingredient | No. of Grams |
|---|---|
| Chlorinated ethylene/vinyl acetate copolymer (chlorine content of 55% and vinyl acetate (VA) content of 6%)[1] | 70.0 |
| Brominated poly (2,3-dichloro-1,3-butadiene) | 30.0 |
| p-Dinitrosobenzene | 10.0 |
| Dibasic lead phosphite | 5.0 |
| Carbon Black | 10.0 |

[1]HYPALON CP-173 (E. I. Du Pont de Nemours & Co.)

The adhesive composition prepared above is coated onto degreased, grit-blasted, cold-rolled steel coupons which have been previously coated with a conventional adhesive prime coat (CHEMLOK 205 - Lord Corporation). The adhesive composition is applied at a film thickness of approximately 0.6 mils. The coated coupons are allowed to dry for approximately 30 minutes and then bonded to HC-106 (55 durometer semiEV cured natural rubber), HC-202 (60-65 durometer Shore A styrene butadiene rubber), and HC-353 (60 durometer neoprene rubber) elastomeric substrates by injection molding the rubber onto the coated coupons at 330° F., and then vulcanizing the rubber at 330° F. for approximately 10 to 15 minutes. The bonded parts are then subjected to the tests described below.

Primary Adhesion Test

Bonded parts are pulled to destruction according to ASTM Test D429 - Method B. Parts are tested in peel with a peel angle of 45 degrees. The test is conducted at room temperature with a test speed of 20 inches per minute. After the bonded part fails, the percent rubber failure of the parts is measured.

72-Hour Salt Spray Test

Bonded parts are buffed on the edges with a grinding wheel. The rubber is then tied back over the metal with stainless steel wire so as to stress the bonded area. This exposes the bondline to the environment. Failure is initiated by scoring the bondline with a razor blade. The parts are then strung on stainless steel wire and placed in a salt spray chamber. The environment inside the chamber is 100° F,, 100 percent relative humidity, and 5 percent dissolved salt in the spray, which is dispersed throughout the chamber. The parts remain in this environment for 72 hours. Upon removal, the rubber is peeled from the metal with pliers. The percent rubber failure is then measured.

7-Day Room Temperature Water Immersion Test

Bonded parts are prepared the same way as they are for the salt spray test. In this test, the parts are placed in a beaker filled with tap water which is at room temperature. The parts remain in this environment for 7 days. Upon removal, the rubber is peeled from the metal with pliers. The percent rubber failure is then measured.

The results of the above tests are set forth in Table 1 below. In the data, reference is made to failure in the rubber body (R). Failure is expressed in terms of percent, and a high percent of failure in the rubber is desirable since this indicates that the adhesive bond is stronger than the rubber itself.

TABLE 1

| Test | Substrate | % Rubber Failure |
|---|---|---|
| Primary Adhesion | HC-106 | 100 R |
| Primary Adhesion | HC-202 | 100 R |
| Primary Adhesion | HC-353 | 100 R |
| 72-hour Salt Spray | HC-106 | 63 R |
| 72-hour Salt Spray | HC-202 | 100 R |
| 72-hour Salt Spray | HC-353 | 3 R |
| 7-day Rm. Temp. H$_2$O | HC-106 | 92 R |
| 7-day Rm. Temp. H$_2$O | Hc-202 | 99 R |
| 7-day Rm. Temp. H$_2$O | HC-353 | 30 R |

EXAMPLE 2

An adhesive composition characterized as an adhesive prime coat is prepared by combining the following ingredients in methylisobutyl ketone in an amount sufficient to create a final total solids content (based on all ingredients) of about 25 percent.

| Ingredient | No. of Grams |
|---|---|
| Chlorinated ethylene/vinyl acetate copolymer (chlorine content of 58% and VA content of 6%)[1] | 50.0 |
| Phenolic Resin[2] | 50.0 |
| Titanium Dioxide | 32.0 |
| Zinc Oxide | 5.0 |
| Fumed Silica | 9.0 |
| Carbon Black | 5.0 |

[1]HYPALON CP-183 (E. I. Du Pont de Nemours & Co.)
[2]Mixture (1:1 ratio) of phenol-formaldehyde resin and phenol/m-cresol-formaldehyde resin

EXAMPLE 3

An adhesive composition characterized as an adhesive prime coat is prepared in accordance with Example 2 except that a chlorinated ethylene/vinyl acetate copolymer having a chlorine content of 55 percent and a VA content of 8 percent (HYPALON CP-176 - E. I. Du Pont de Nemours & Co.) is utilized in lieu of the HYPALON CP-183.

The adhesive compositions prepared above in Examples 2 and 3 are coated onto degreased, grit-blasted, cold-rolled steel coupons at a film thickness of approximately 0.3 mils. The coated coupons are allowed to dry for approximately 30 minutes, after which a conventional adhesive overcoat (CHEMLOK 220 - Lord Corporation) is applied to the coated coupons. The coated coupons are again allowed to dry for approximately 30 minutes and are then bonded to the HC-106 and HC-353 substrates by compression molding for 15 minutes at 307° F. The bonded parts are then subjected to the Primary Adhesion and 72-Hour Salt Spray tests described above, as well as the tests described below.

Conical Adhesion Test

Bonded parts are prepared according to ASTM D429-Method C. The conical parts are pulled to destruction by the use of a laboratory tensile tester and the percent rubber failure is recorded.

2-Hour Boiling Water Test

Bonded parts are prepared the same way as they are for the salt spray test; however, in this test, the parts are placed in a beaker filled with boiling tap water. The parts remain in this environment for 2 hours. Upon removal, the rubber is peeled from the metal with pliers. The percent rubber failure is then measured.

The results of the above tests are set forth in Table 2 below.

TABLE 2

| Example | Test | Substrate | Percent Rubber Failure |
|---|---|---|---|
| 2 | Conical Adhesion | HC-106 | 85 R |
| 3 | Conical Adhesion | HC-106 | 30 R |
| 2 | Conical Adhesion | HC-353 | 30 R |
| 3 | Conical Adhesion | HC-353 | 90 R |
| 2 | Primary Adhesion | HC-353* | 97 R |
| 3 | Primary Adhesion | HC-353* | 100 R |
| 2 | Boiling Water | HC-106 | 73 R |
| 3 | Boiling Water | HC-106 | 35 R |
| 2 | Boiling Water | HC-353 | 70 R |
| 3 | Boiling Water | HC-353 | 99 R |
| 2 | 72-Hr. Salt Spray | HC-353 | 99 R |
| 3 | 72-Hr. Salt Spray | HC-353 | 98 R |

*Coated coupon is exposed to temperature of 307° F. for approximately 5 minutes prior to bonding.

The adhesive compositions of Examples 2 and 3 are also utilized as a one-coat adhesive composition to bond HC-600 (acrylontrile-butadiene copolymer rubber) elastomeric substrate to both degreased, grit-blasted and degreased, zinc-phosphatized steel coupons. The adhesive compositions are coated directly onto the clean steel coupons at a film thickness of approximately 0.4 mils and allowed to dry for approximately 30 minutes. The coupons are then bonded to the HC-600 substrate by compression molding for 15 minutes at 307° F. The bonded parts are subjected to the Primary Adhesion test and the results are given below in Table 3.

TABLE 3

| Example | Type Steel | Percent Rubber Failure |
|---|---|---|
| 2 | zinc-phosphatized | 99 R |
| 3 | zinc-phosphatized | 100 R |
| 2 | grit-blasted | 74 R |
| 3 | grit-blasted | 98 R |

EXAMPLE 4

A single-coat adhesive con, position is prepared by combining 100 g of a chlorinated ethylene/vinyl acetate copolymer having a chlorine content of 59 percent and a VA content of 8 percent (HYPALON CP-186 - E. I. Du Pont de Nemours & Co.) with an equal volume of xylene.

EXAMPLE 5

An adhesive con, position is prepared according to Example 4 except that HYPALON CP-176 (chlorine content of 55 percent and VA content of 8 percent) is utilized as the chlorinated ethylene/vinyl acetate copolymer.

Degreased, grit-blasted steel coupons are dipped into the respective adhesive compositions of Examples 4 and 5 and allowed to dry. The dipping process is repeated until a film thickness of 0.3 to 0.4 mils is obtained. The coated coupons are then bonded to HC-600 (acrylonitrile-butadiene copolymer rubber) elastomeric substrate by compression molding for 25 minutes at 307° F. The bonded parts are subjected to the Primary Adhesion test and the results are given below in Table 4.

TABLE 4

| Example | Percent Rubber Failure |
|---|---|
| 4 | 82 R |
| 5 | 75 R |

As can be seen from the above data, the chlorinated ethylene/vinyl acetate copolymers of the present invention can be effectively utilized with an adhesion-promoting additive to prepare effective one-coat and two-coat adhesive compositions. The data also indicates that the copolymers are capable of bonding acrylonitrile-butadiene copolymer rubber without the assistance of an adhesion-promoting additive.

What is claimed is:

1. An adhesive composition comprising a chlorinated ethylene/vinyl acetate copolymer and at least one adhesion-promoting additive selected from the group consisting of a phenolic resin and an aromatic nitroso con, pound.

2. An adhesive composition according to claim 1 wherein the chlorinated ethylene/vinyl acetate copolymer has a chlorine content of from about 40 to 70 percent by weight.

3. An adhesive composition according to claim 2 wherein the chlorine content is from about 50 to 65 percent by weight.

4. An adhesive composition according to claim I wherein the phenolic resin is prepared by reacting a phenolic compound with an aldehyde compound.

5. An adhesive con, position according to claim 4 wherein the phenolic compound is selected from the group consisting of phenol, p-t-butylphenol, p-phenylphenol, o-ethylphenol, p-chlorophenol, p-alkoxyphenol, o-cresol, m-cresol, p-cresol, o-chlorophenol, m-bromophenol, 2-ethylphenol, amylphenol, nonylphenol, cashew nutshell liquid, resorcinol, orcinol, phloroglucinol, pyrocatechol, pyrogallol, naphthol, xylenol, carvacrol, salicylic acid, bisphenol A, bisphenol S, and combinations thereof.

6. An adhesive composition according to claim 5 wherein the phenolic compound is phenol.

7. An adhesive composition according to claim 4 wherein the aldehyde compound is selected from the group consisting of formaldehyde, acetaldehyde, propionaldehyde, isobutyraldehyde, 2-ethylbutrylaldehyde, 2-methylpentaldehyde, 2-ethylhexaldehyde, paraformaldehyde, trioxane, furfural, hexmethylene-tetramine, benzaldehyde, and acetals which liberate formaldehyde upon heating.

8. An adhesive composition according to claim 7 wherein the aldehyde compound is formaldehyde.

9. An adhesive composition according to claim 1 wherein the phenolic resin is selected from the group consisting of unmodified phenolic resins, cashew-modified phenolic resins, epoxy-modified phenolic resins, and elastomer-modified phenolic resins.

10. An adhesive composition according to claim 1 wherein the phenolic resin is a mixture of a phenol-formaldehyde resin and a phenolformaldehyde resin modified with cresol.

11. An adhesive composition according to claim I wherein the nitroso compound is selected from the group consisting of m-dinitrosobenzene, p-dinitrosobenzene, m-dinitrosonaphthalene, p-dinitrosonaphthalene, 2,5-dinitroso-p-cymene, 2-methyl-1,4-dinitrosobenzene, 2-methyl-5-chloro- 1,4-dinitrosobenzene, 2-fluoro- 1,4-dinitrosobenzene, 2-methoxy-l-3-dinitroso-benzene, 5-chloro-1,3-dinitrosobenzene, 2-benzyl- 1,4-dinitrosobenzene, 2-cyclohexyl- 1,4-dinitrosobenzene and combinations thereof.

12. An adhesive composition according to claim 11 wherein the nitroso compound is p-dinitrosobenzene or m-dinitrosobenzene.

13. An adhesive composition according to claim 1 further comprising an additional halogenated polymeric material.

14. An adhesive composition according to claim 13 wherein the additional halogenated polymeric material is selected from the group consisting of chlorinated natural rubber, chlorine- and bromine-containing synthetic rubbers, polychloroprene, chlorinated polychloroprene, chlorinated polyisoprene, chlorinated polybutadiene, butadiene/halogenated cyclic conjugated diene adducts, chlorinated butadiene styrene copolymers, chlorosulfonated polyethylene, brominated poly(2,3-dichloro-1,3-butadiene), copolymers of $\alpha$-haloacrylonitriles and 2,3-dichloro- 1,3-butadiene, chlorinated poly(vinyl chloride), chlorinated polyethylene, chlorinated ethylene/propylene copolymers, chlorinated ethylene/- propylene/non-conjugated diene terpolymers and mixtures thereof.

15. An adhesive composition according to claim 1 further comprising a metal oxide.

16. An adhesive composition according to claim 15 wherein the metal oxide is selected from the group consisting of the oxides of zinc, cadmium, magnesium, lead, and zirconium; litharge; red lead; zirconium salts; and combinations thereof.

17. An adhesive composition according to claim 1 further comprising a lead-containing compound.

18. An adhesive composition according to claim 17 wherein the lead-containing compound is selected from the group consisting of dibasic lead phthalate, monohydrous tribasic lead maleate, tetrabasic lead fumarate, dibasic lead phosphite, basic lead carbonate, lead oxide, lead dioxide, and mixtures thereof.

19. An adhesive composition according to claim 1 wherein the ethylene/vinyl acetate copolymer is present in an amount ranging from about 1 to 99 percent by weight and the adhesion promoting additive is present in an amount ranging from about 1 to 99 percent by weight.

20. An adhesive composition according to claim 19 wherein the ethylene/vinyl acetate copolymer is present in an amount ranging from about 40 to 60 percent by weight and the adhesion promoting additive is present in an amount ranging from about 40 to 60 percent by weight.

21. An adhesive composition according to claim 1 wherein the adhesion promoting additive is a nitroso compound and the nitroso compound is present in an amount ranging from about 1 to 60 percent by weight.

22. An adhesive composition according to claim 21 wherein the nitroso compound is present in an amount ranging from about 3 to 10 percent by weight.

* * * * *